(12) United States Patent
Love

(10) Patent No.: US 8,499,092 B2
(45) Date of Patent: *Jul. 30, 2013

(54) VALIDATING DOWNLOAD SUCCESS

(75) Inventor: Robert Love, Boston, MA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,466

(22) Filed: Jun. 23, 2011

(65) Prior Publication Data

US 2012/0331037 A1    Dec. 27, 2012

(51) Int. Cl.
*G06F 15/16*    (2006.01)
(52) U.S. Cl.
USPC .......................... 709/231; 709/203; 709/246
(58) Field of Classification Search
None
See application file for complete search history.

(56) References Cited

U.S. PATENT DOCUMENTS

| 7,565,429 | B1 | 7/2009 | Fernandez | |
| 2002/0161908 | A1* | 10/2002 | Benitez et al. | 709/231 |
| 2007/0106745 | A1 | 5/2007 | Sakoh et al. | |
| 2008/0155634 | A1 | 6/2008 | Khedouri et al. | |
| 2008/0235746 | A1* | 9/2008 | Peters et al. | 725/111 |
| 2011/0231569 | A1 | 9/2011 | Luby et al. | |
| 2011/0239078 | A1 | 9/2011 | Luby et al. | |
| 2012/0331040 | A1 | 12/2012 | Love | |

* cited by examiner

*Primary Examiner* — Mohamed Ibrahim
(74) *Attorney, Agent, or Firm* — Morris & Kamlay LLP

(57) ABSTRACT

Methods, systems, and apparatuses, including computer programs encoded on a computer storage medium, for validating download success are disclosed. A method can include receiving a request to transmit a digital item to a computing device, transmitting a modified digital item to the computing device, and receiving confirmation that the computing device has received the modified digital item in its entirety. The method can also include for each of N invalid data portions included in the modified digital item, transmitting to the computing device a location of the invalid data portion in the modified digital item, and the existing data portion previously replaced by the invalid data portion; and receiving confirmation that the computing device has received the existing data portion. In response to receiving confirmations, an indication that the computing device has received all N existing data portions replaced by the N invalid data portions can be transmitted to the computing device.

20 Claims, 5 Drawing Sheets

VALIDATING DOWNLOAD SUCCESS

BACKGROUND

Internet users may access the web via computational devices, such as, laptops, smartphones, tablet computing devices, personal digital assistants (PDAs), etc. Applications allow a user to access information sources, webpages, games, and other virtual tools.

Internet users may also seek access to large software program files or other types of large data files (e.g., audio, video, applications, etc.). Obtaining access to large data files may require pre-authorization. Downloading the large data files across the web may include establishing a secure data session and downloading the data in packets or groups of packets. Although an initial authorization procedure may be used to limit unauthorized access to downloading data files, additional measures may be enacted during the downloading process to limit unauthorized access to the data files.

BRIEF SUMMARY

One aspect of the subject matter described in this specification can be embodied in methods that include the actions of include receiving a request to transmit a digital item to a computing device, transmitting a modified digital item to the computing device, wherein the modified digital item includes N existing data portions replaced with N invalid data portions, wherein N is an integer greater than or equal to one, and receiving confirmation that the computing device has received the modified digital item in its entirety. The method can also include for each of the N invalid data portions included in the modified digital item, transmitting to the computing device a location of the invalid data portion in the modified digital item, and the existing data portion previously replaced by the invalid data portion; and receiving confirmation that the computing device has received the existing data portion. In response to receiving confirmations for each of the N existing data portions transmitted to the computing device, an indication that the computing device has received all N existing data portions replaced by the N invalid data portions can be transmitted to the computing device One aspect of the subject matter described in this specification can be embodied in a computer storage medium encoded with a computer program, the program comprising instructions that when executed by one or more computers cause the one or more computers to perform operations comprising include receiving a request to transmit a digital item to a computing device, transmitting a modified digital item to the computing device, wherein the modified digital item includes N existing data portions replaced with N invalid data portions, wherein N is an integer greater than or equal to one, and receiving confirmation that the computing device has received the modified digital item in its entirety. The operations can also include for each of the N invalid data portions included in the modified digital item, transmitting to the computing device a location of the invalid data portion in the modified digital item, and the existing data portion previously replaced by the invalid data portion; and receiving confirmation that the computing device has received the existing data portion. In response to receiving confirmations for each of the N existing data portions transmitted to the computing device, an indication that the computing device has received all N existing data portions replaced by the N invalid data portions can be transmitted to the computing device.

Another aspect of the subject matter described in this specification can be embodied a system comprising one or more computers, and a computer-readable medium coupled to the one or more computers having instructions stored thereon which, when executed by the one or more computers, cause the one or more computers to perform operations comprising include receiving a request to transmit a digital item to a computing device, transmitting a modified digital item to the computing device, wherein the modified digital item includes N existing data portions replaced with N invalid data portions, wherein N is an integer greater than or equal to one, and receiving confirmation that the computing device has received the modified digital item in its entirety. The operations can also include for each of the N invalid data portions included in the modified digital item, transmitting to the computing device a location of the invalid data portion in the modified digital item, and the existing data portion previously replaced by the invalid data portion; and receiving confirmation that the computing device has received the existing data portion. In response to receiving confirmations for each of the N existing data portions transmitted to the computing device, an indication that the computing device has received all N existing data portions replaced by the N invalid data portions can be transmitted to the computing device.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
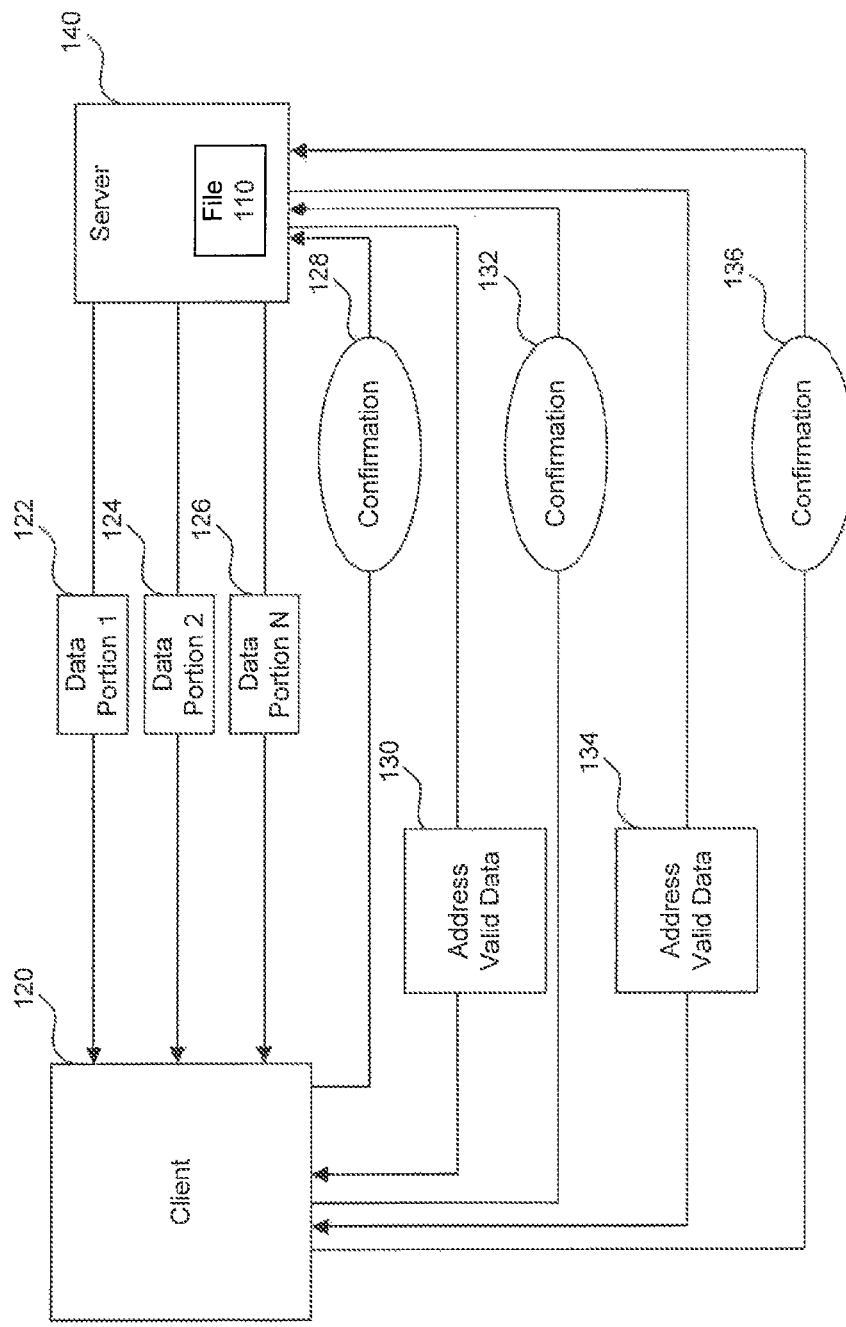
FIG. 1 is a block diagram of an exemplary client/server communication network exchanging data.

FIG. 1 is a block diagram of a client/server communication network according to an embodiment. Referring to FIG. 1, a client computing device or client device 120 may be a computer, handheld computing device, mobile station, tablet device or other computing device capable of communicating with a server device 140 over a network (e.g., the Internet). The client 120 may initiate communication with the server 140 by establishing a communication session and creating a secure channel with the server 140. The client may pre-authorize the communication session by submitting user credentials (username, password, numeric code, etc.) or via user device credentials. For example, a hypertext transfer protocol secure (HTTPS), which is a combination of the hypertext transfer protocol and the secure socket layer (SSL) and transport layer security (TLS) protocol, may be used to provide encrypted communication and secure identification to the server 140. Pre-authorization may limit access to the file(s) from untrusted or rogue clients.

In operation, the communication session between the client 120 and the server 140 may include exchanging data portions. The data portions may include multiple portions of data which together comprise one large data file 110. For example, portions 1, 2 . . . N are represented by 122, 124 and 126 can together comprise the data file 110. There may be any number of data portions used by the server 140 to communicate the file 110. The data portions 122-126 may include one or more data packets and may be transmitted from the server 140 across a network (e.g., the Internet) to the client 120.

After the data portions 122-126 are transmitted a confirmation 128 may be transmitted back to the server 140 from the client 120 to confirm that all the data portions were received properly. In one embodiment, a confirmation 128 may be transmitted back to the server 140 from the client 120 for each of the data portions 122-126. Therefore after each data portion 122-126 is received at the client, the client 120 sends a confirmation 128 to the server 140 that the respective data portion was received.

The server 140 can modify the data in one or more of the data portions 122-126 and include invalid data in the modified data portion prior to transmitting them to the client 120. After all the data portions are transmitted, including the valid and invalid data, the server 140 may begin notifying the client 120 that certain data portions from the transmission contained invalid data. The server 140 can send a first packet 130 indicating the address of the data portion that contained invalid data and include the valid data with the packet. In response, the client 120 may transmit a confirmation message 132 to the server 140 once packet 130 is received by the client 120. This process may repeat for additional data portions that are transmitted until the last packet 134 including the address of the last data portion of invalid and the valid data to replace the invalid data as been sent by the server 140. The client can confirm receipt of the last packet with a final confirmation 136. The data file 110 at the client 120 now includes all data portions of valid data.

Any number of data portions transmitted 122, 124 and 126 may have been substituted with invalid data. The data substitution may occur during to the transmission process. For instance, the server 140 may select random data portions that will be substituted with invalid data during the regular download process. Alternatively, the server 140 may select the data portions to be replaced with invalid data prior to the start of the transmission process.

In this example, data portion 2, 124 and data portion N, 126 may have been substituted with invalid data during the download procedure. The client 120 was not aware of the invalid data received until after the initial download process had ended.

Networks use various mechanisms to confirm completion of transmissions (for example, a FIN packet is sent on IP-based networks such as the Internet), which computing devices may transmit automatically. A user may access a file source and initiate a download operation by selecting one or more files or software programs to download.

Figure 2:
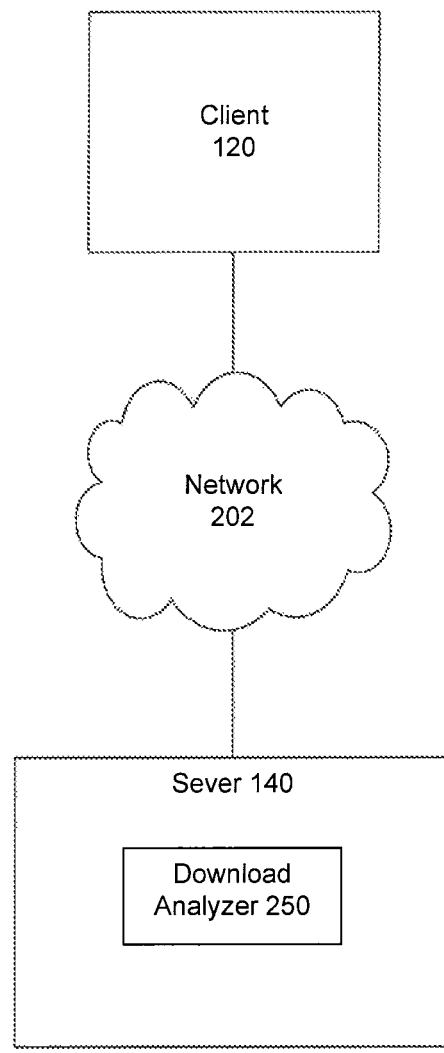
FIG. 2 is a system configuration of an exemplary client/server model.

FIG. 2 is a block diagram of an exemplary client/server model configured to perform a customized download operation, according to an embodiment. Client 120 and server 140, or any combination of their components, may be part of or may be implemented with computing devices. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, or other type of computer system having at least one processor and memory. Such a computing device may include software, firmware, hardware, or a combination thereof. Software may include one or more applications and an operating system. Hardware can include, but is not limited to, a processor, memory and user interface display.

Server 140 may include a transmitter and receiver used to transmit and receive data messages. The server 140 is in communication with client 120 via a communication network 202 (e.g., the Internet, local area network, wide area network, etc.) The client 120 and the server 140 may communicate over a secure connection. A download analyzer 250 may be used to prepare the download of a data file(s) from the client 120. The download analyzer 250 may also be used to randomly select data portions included in the download to substitute with invalid data portions during or before the initial download process. The download analyzer 250 may then be responsible for ensuring the correct data portion is transmitted to the client 120 after the initial download sequence. Examples of the embodiments for client 120, server 140 and download analyzer 250, and methods or any parts or function(s) thereof may be implemented using hardware, software modules, firmware, tangible computer readable or computer usable storage media having instructions stored thereon, or a combination thereof and may be implemented in one or more computer systems or other processing systems.

Figure 3:
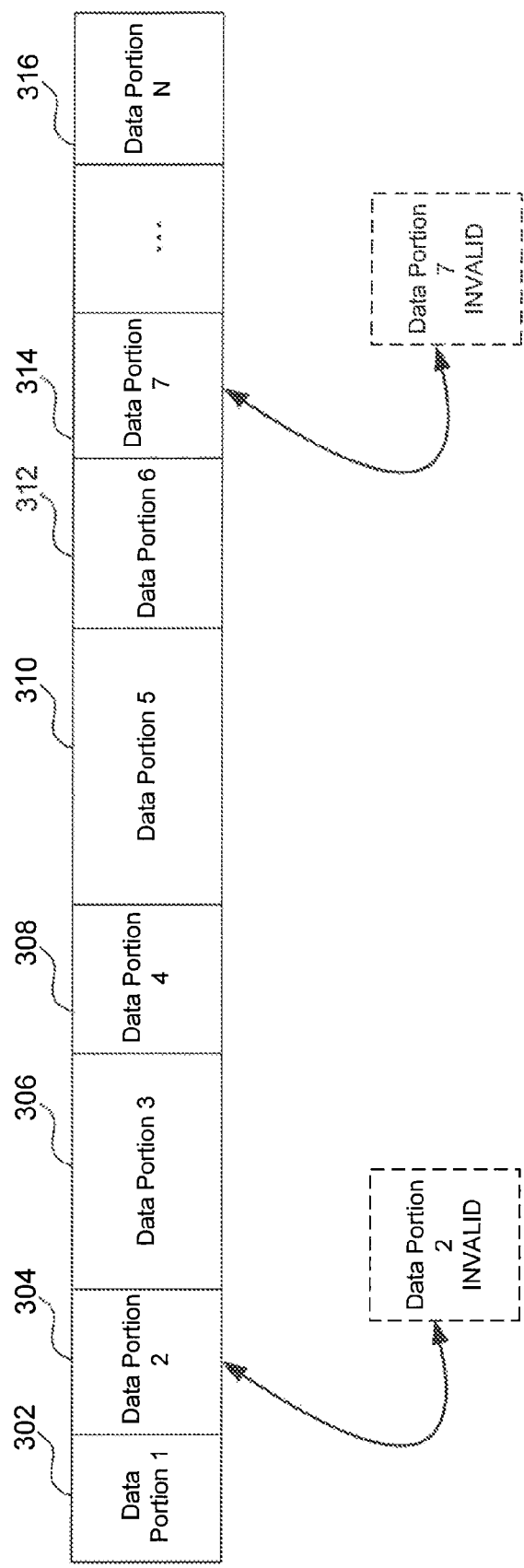
FIG. 3 is an example group of data portions associated with a client download operation.

FIG. 3 is an example group of data portions associated with a client download operation. Referring to FIG. 3, data portions 1-N identified as 302-316 are illustrated. A downloaded data file(s) may include several data portions of data packets or other data units. A client may initiate a download and receive any number of data portions.

Assuming the client is receiving 7 data portions of data 302-314, the server may randomly select a number of data portions to replace with invalid data. In this example, the server has randomly selected data portions 304 and 314 to be replaced with invalid replacement data.

During the download, the server may randomly remove portions of the valid data to be downloaded with invalid data. The server will randomly select portions of the download sequence and replace it with invalid data that would not prove useful or would compromise the overall user experience of accessing the data. The random selection off data portions to invalidate, and how many data portions to invalidate in a complete data portion sequence may change each time a user downloads a file or group of files.

The valid data may be selected at random intervals to include various different amounts of data. Certain portions of the valid data will be selected at random intervals to be replaced with data portions of invalid data. The data in the invalid data portion may be useless data that is later replaced with actual valid data at the end of the download sequence.

In one example, suppose a file consists of data portions 302-314, and the client has requested download of the file. Once the client has downloaded the data portions 302-314 and has confirmed receipt of each of the data portions 302-314, the server may notify the client that one or more of the downloaded data portions of data may include invalid data. The server then sends the valid data as well as the address of the invalid data to the client for each data portion of invalid data. The client can confirm receipt of each of these transmissions. Therefore, each time the address of the invalid data and the valid data is sent to the client, the client confirm receipt. In one embodiment, the client can confirm receipt once the server has sent all the addresses and the valid data for the invalid data in already downloaded data portions of data.

A timer may commence at the end of a successful download to control access to downloaded content. In the case of this system, that timer may not begin until the described system validated that the download occurred successfully.

Figure 4:
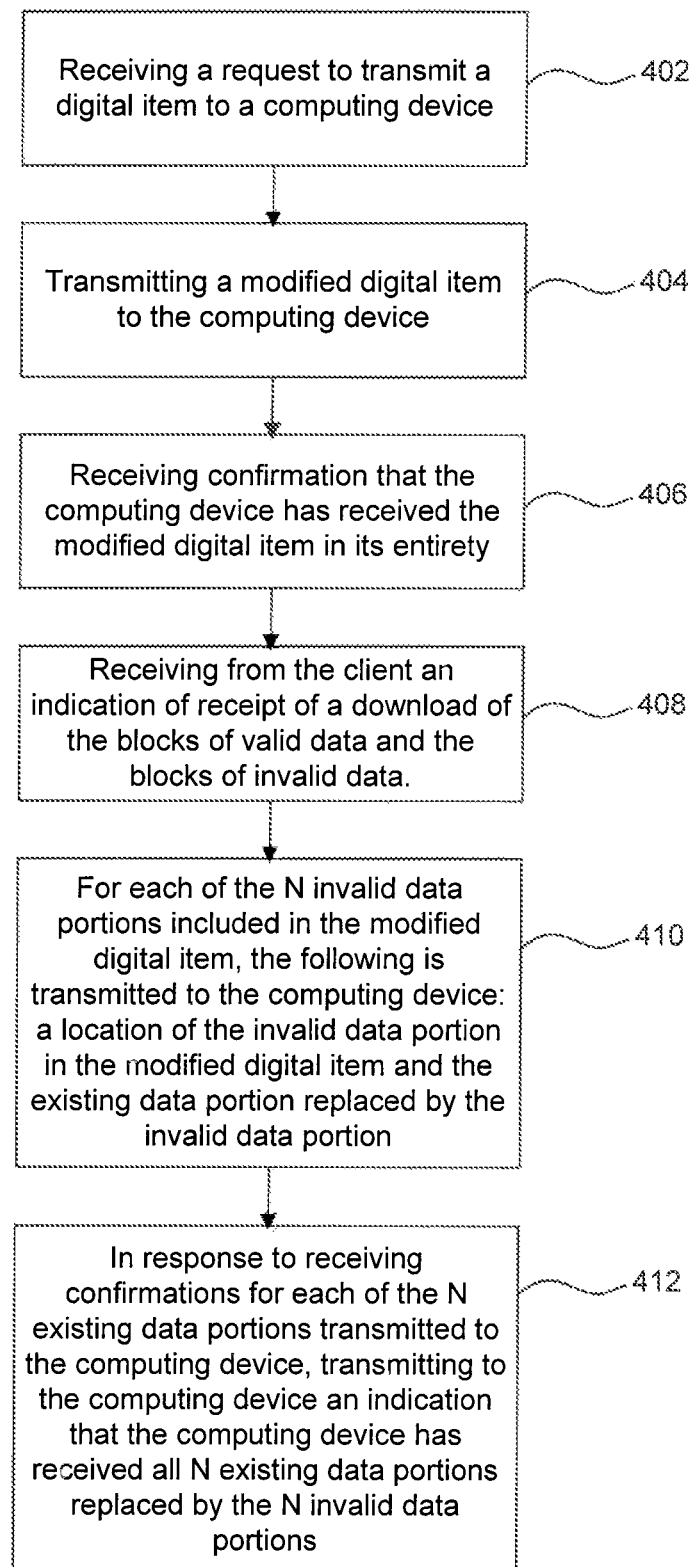
FIG. 4 is a flow chart of an example method of validating download success.

FIG. 4 is a flow diagram of a method for validating download success according to an example embodiment.

At step 402, a request is received to transmit a digital item to a computing device. A client may be requesting to download one or more large data files (e.g., music, video, program files, etc.).

At step 404, a modified digital item is transmitted to the computing device. The modified digital item may include N existing data portions replaced with N invalid data portions, where N is an integer greater than or equal to one.

In one embodiment, the digital item may be modified by identifying the N existing data portions included in the digital item for replacement with the N invalid data portions, and replacing the N existing data portions with the N invalid data portions.

In one embodiment, modifying the digital item is performed at a same time as the transmitting the modified digital item to the computing device. In another embodiment, modifying the digital item is performed prior to transmitting the modified digital item to the computing device.

In one embodiment, identifying the N existing data portions is randomly determined.

In one embodiment, a modified digital item can be generated which includes identifying the N existing data portions included in the digital item for replacement with the N invalid data portions, and replacing the N existing data portions with the N invalid data portions to generate the modified digital file.

At step 406, confirmation is received that the computing device has received the modified digital item in its entirety.

At step 408, for each of the N invalid data portions included in the modified digital item, the following is transmitted to the computing device: a location of the invalid data portion in the modified digital item and the existing data portion previously replaced by the invalid data portion. Confirmation may be received that the computing device has received the existing data portion.

At step 410, in response to receiving confirmations for each of the N existing data portions transmitted to the computing device, an indication that the computing device has received all N existing data portions replaced by the N invalid data portions is transmitted to the computing device.

Figure 5:
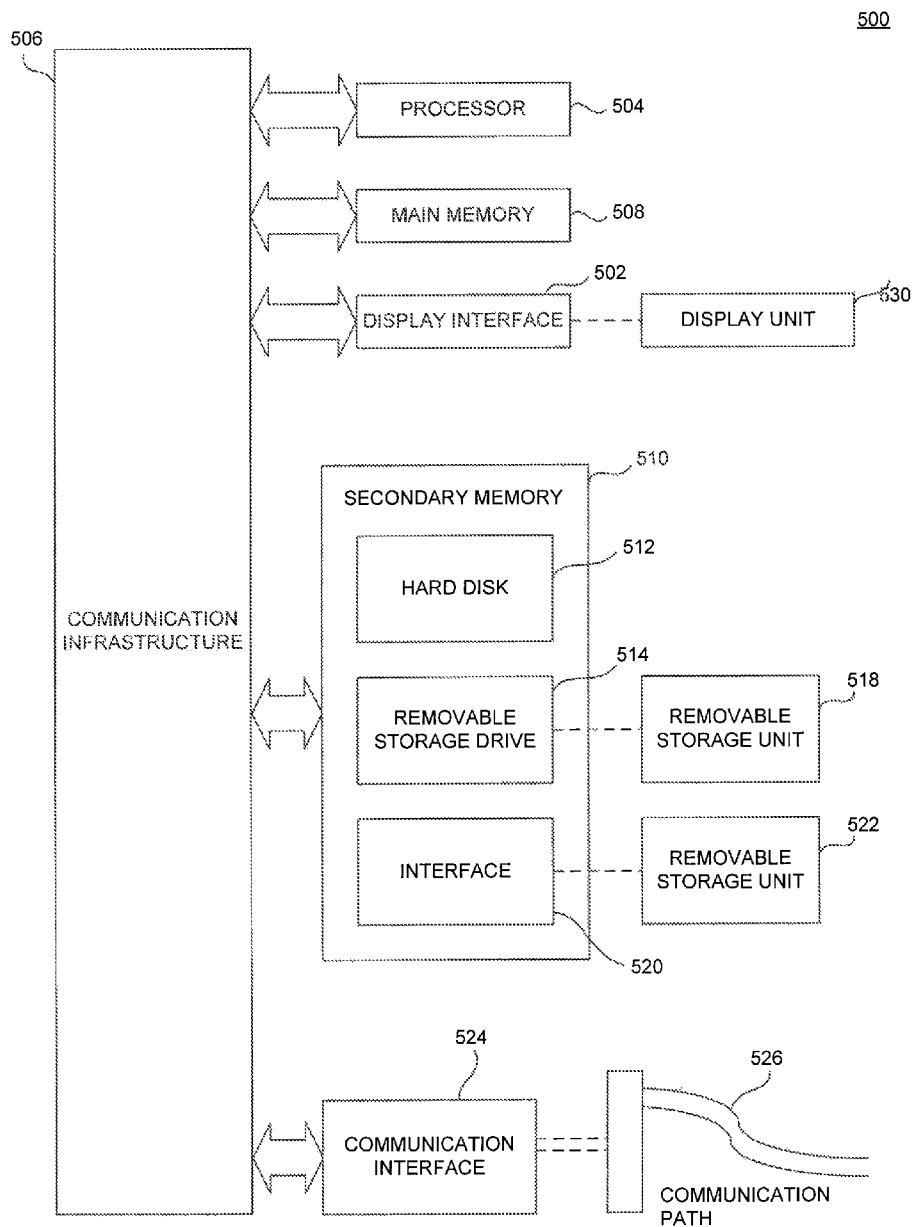
FIG. 5 is a system diagram that can be used to embody or implement embodiments described herein.

FIG. 5 illustrates an example computer system 500 in which embodiments of the present invention, or portions thereof, may by implemented as computer-readable code. For example, client 120, server 140 and/or download analyzer 250 may be implemented in computer system 500 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed parallel, concurrently, and/or in a distributed environment, and with program code stored locally or remotely for access by single or multi-processor machines, in addition, in some embodiments the order of operations may be rearranged without departing from the spirit of the disclosed subject matter.

Processor device 504 may be a special purpose or a general-purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc.

which is read by and written to by removable storage drive 514. As will be appreciated by persons skilled in the relevant art, removable storage unit 518 includes a computer usable storage medium having stored therein computer software and/or data.

Computer system 500 (optionally) includes a display interface 502 (which can include input and output devices such as keyboards, mice, etc.) that forwards graphics, text, and other data from communication infrastructure 506 (or from a frame buffer not shown) for display on display unit 530.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the method illustrated by the flowchart in FIG. 6 discussed below. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving from a client a request for a download of a digital item, wherein the digital item includes existing data portions;
   creating a modified digital item from the digital item, wherein the modified digital item includes N existing data portions replaced with N invalid data portions, wherein N is an integer greater than or equal to one;
   providing M existing data portions not replaced with the N invalid data portions and the N existing data portions replaced with the N invalid data portions to the client;
   receiving from the client an indication of receipt of a download of the M existing data portions not replaced with the N invalid data portions and the N existing data portions replaced with the N invalid data portions;
   for each of the N existing data portions replaced with the N invalid data portions:
      providing to the client a location of the invalid data portion;
      providing to the client a respective valid data portion to replace the invalid data portion; and
      receiving from the client an indication of receipt of each of the respective valid data portions; and
   providing a notification to the client indicating that the digital item has been downloaded.

2. The computer-implemented method of claim 1, further comprising:
   providing to the client a notification indicating that the N invalid data portions were replaced with respective valid data.

3. The computer-implemented method of claim 1, further comprising: receiving from the client an indication of a complete download of the digital item.

4. The computer-implemented method of claim 1, wherein the digital item is an application file.

5. The computer-implemented method of claim 1, wherein the digital item is a music file.

6. The computer-implemented method of claim 1, wherein the client is a rogue client.

7. The computer-implemented method of claim 1, wherein the client is an untrusted client.

8. The computer-implemented method of claim 1, wherein the N existing data portions are randomly determined.

9. A computer storage device encoded with a computer program, the program comprising instructions that when executed by one or more computers cause the one or more computers to perform operations comprising:
   receiving from a client a request for a download of a digital item, wherein the digital item includes existing data portions;
   creating a modified digital item from the digital item, wherein the modified digital item includes N existing data portions replaced with N invalid data portions, wherein N is an integer greater than or equal to one;
   providing M existing data portions not replaced with the N invalid data portions and the N existing data portions replaced with the N invalid data portions to the client;
   receiving from the client an indication of receipt of a download of the M existing data portions not replaced with the N invalid data portions and the N existing data portions replaced with the N invalid data portions; and
   for each of the N existing data portions replaced with the N invalid data portions:
      providing to the client a location of the invalid data portion;
      providing to the client a respective valid data portion to replace the invalid data portion; and
      receiving from the client an indication of receipt of each of the respective valid data portions; and
   providing a notification to the client indicating that the digital item has been downloaded.

10. The computer storage device of claim 9, wherein the operations further comprise:
   providing to the client a notification indicating that the N invalid data portions were replaced with respective valid data.

11. The computer storage device of claim 9, wherein the operations further comprise:
   receiving from the client an indication of a complete download of the digital item.

12. The computer storage device of claim 9, wherein the digital item is an application file.

13. The computer storage device of claim 9, wherein the digital item is a music file.

14. The computer storage device of claim 8, wherein the client is a rogue client.

15. A system comprising:
   one or more computers; and
   a computer-readable medium coupled to the one or more computers having instructions stored thereon which, when executed by the one or more computers, cause the one or more computers to perform operations comprising:
   receiving from a client a request for a download of a digital item, wherein the digital item includes existing data portions;
   creating a modified digital item from the digital item, wherein the modified digital item includes N existing data portions replaced with N invalid data portions, wherein N is an integer greater than or equal to one;
   providing M existing data portions not replaced with the N invalid data portions and the N existing data portions replaced with the N invalid data portions to the client;
   receiving from the client an indication of receipt of a download of the N existing data portions not replaced with the N invalid data portions and the N existing data portions replaced with the N invalid data portions;
   for each of the N existing data portions replaced with the N invalid data portions:
      providing to the client a location of the invalid data portion;
      providing to the a client respective valid data portion to replace the invalid data portion; and
      receiving from the client an indication of receipt of each of the respective valid data portions; and
   providing a notification to the client indicating that the digital item has been downloaded.

16. The system of claim 15, wherein the operations further comprise:
   providing to the client a notification indicating that the N invalid data portions were replaced with respective valid data.

17. The system of claim 15, wherein the operations further comprise:
   receiving from the client an indication of a complete download of the digital item.

18. The system of claim 15, wherein the digital item is an application file.

19. The system of claim 15, wherein the digital item is a music file.

20. The system of claim 15, wherein the client is a rogue client.

* * * * *